Sept. 26, 1961     A. J. STOCK     3,001,597
SPRING LOADED COMPENSATOR
Filed March 25, 1958     8 Sheets-Sheet 1

INVENTOR
Arthur J. Stock
BY *Stevens, Davis, Miller & Mosher*
ATTORNEYS

Sept. 26, 1961 A. J. STOCK 3,001,597
SPRING LOADED COMPENSATOR
Filed March 25, 1958 8 Sheets-Sheet 2

INVENTOR
Arthur J. Stock
BY Stevens, Davis, Miller & Mosher
ATTORNEYS

Sept. 26, 1961 A. J. STOCK 3,001,597
SPRING LOADED COMPENSATOR
Filed March 25, 1958 8 Sheets-Sheet 3

INVENTOR
Arthur J. Stock
BY Stevens, Davis, Miller & Mosher
ATTORNEYS

INVENTOR
Arthur J. Stock

Sept. 26, 1961 A. J. STOCK 3,001,597
SPRING LOADED COMPENSATOR
Filed March 25, 1958 8 Sheets-Sheet 5
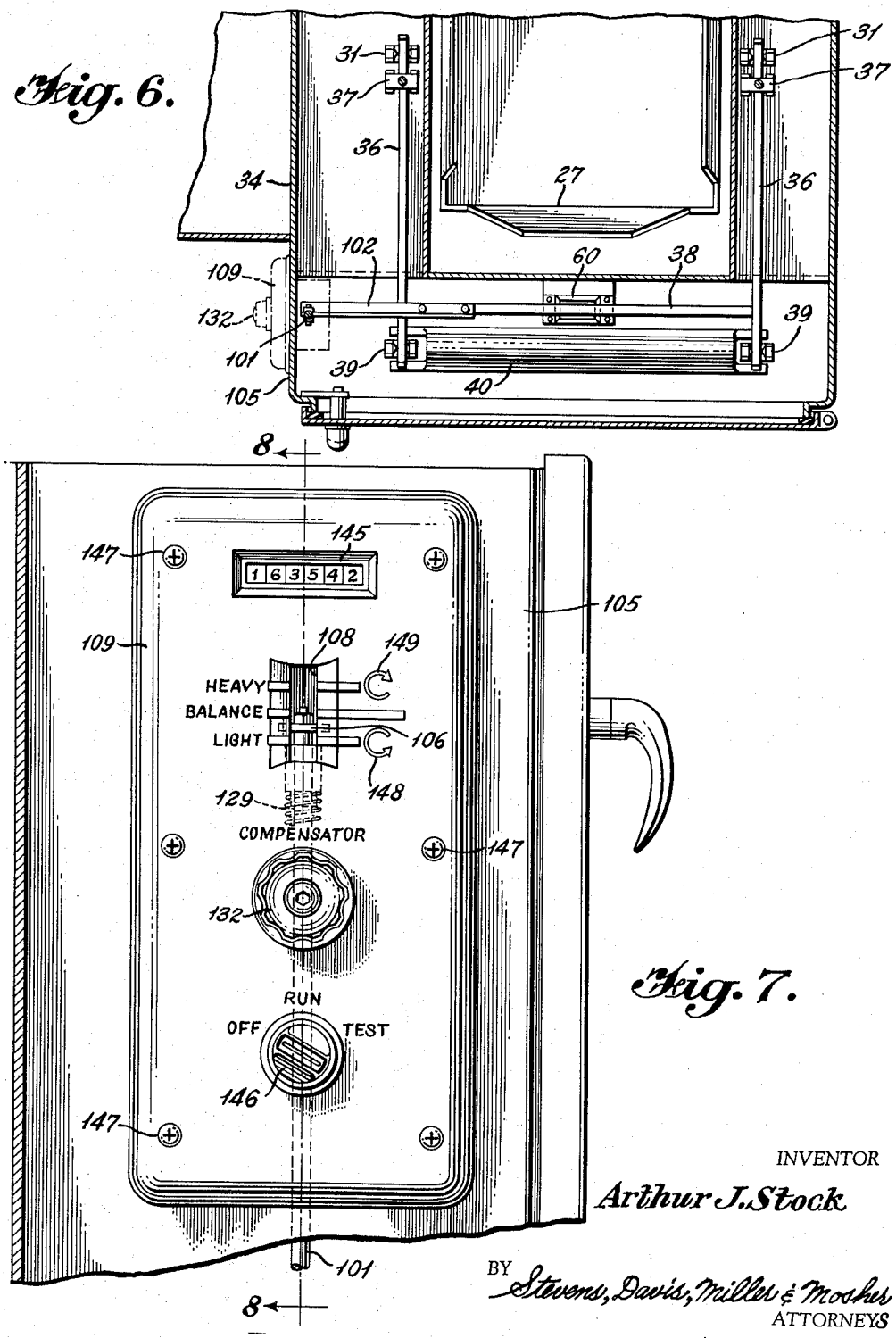
INVENTOR
Arthur J. Stock
BY Stevens, Davis, Miller & Mosher
ATTORNEYS

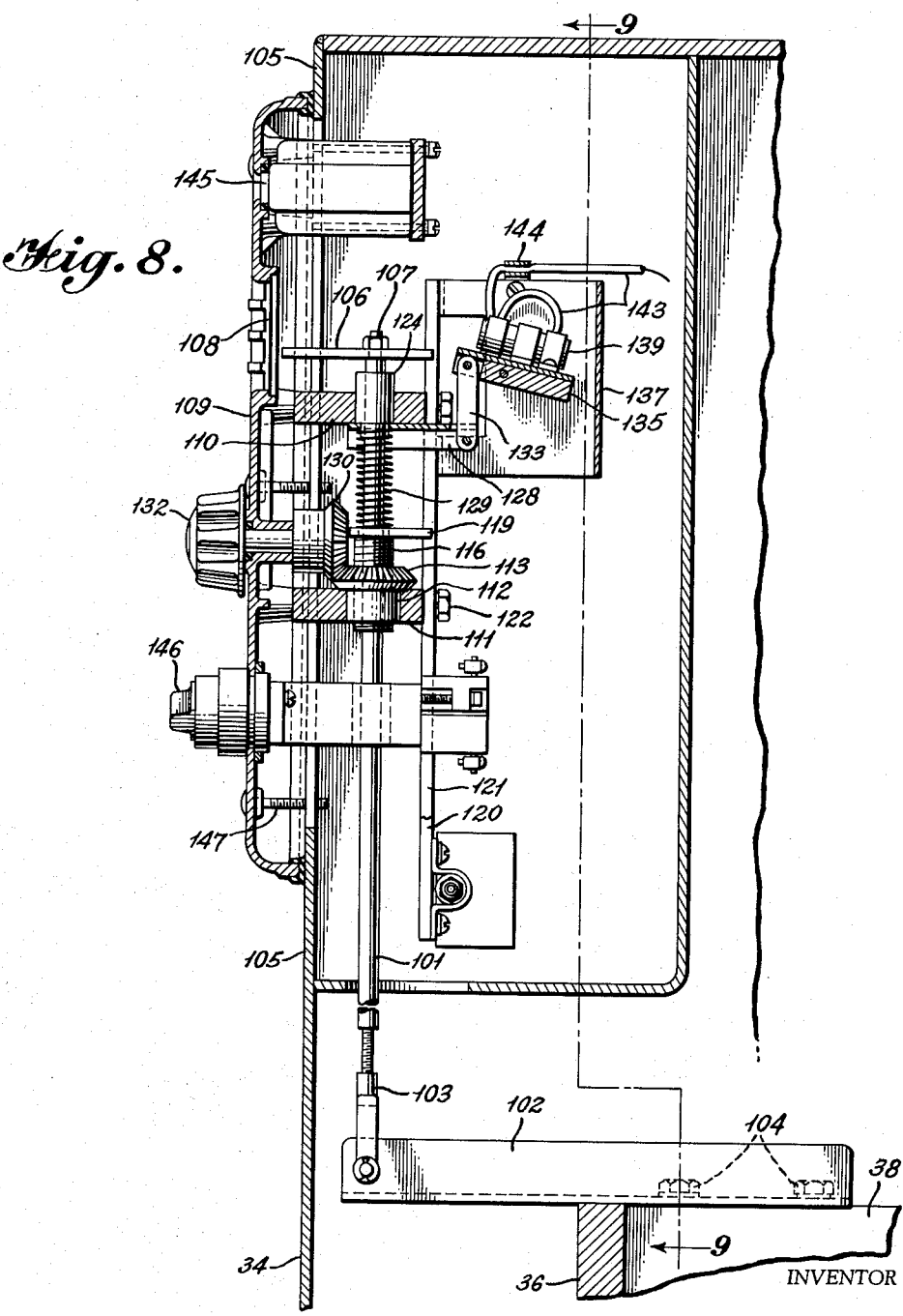

Sept. 26, 1961 A. J. STOCK 3,001,597
SPRING LOADED COMPENSATOR
Filed March 25, 1958 8 Sheets-Sheet 7

INVENTOR
Arthur J. Stock
BY
Stevens, Davis, Miller & Mosher
ATTORNEYS

Sept. 26, 1961  A. J. STOCK  3,001,597
SPRING LOADED COMPENSATOR
Filed March 25, 1958  8 Sheets-Sheet 8

INVENTOR
Arthur J. Stock
BY Stevens, Davis, Miller & Mosher
ATTORNEYS

United States Patent Office 3,001,597
Patented Sept. 26, 1961

---

3,001,597
SPRING LOADED COMPENSATOR
Arthur J. Stock, Lakewood, Ohio, assignor to Stock Equipment Company, Cleveland, Ohio, a corporation of Ohio
Filed Mar. 25, 1958, Ser. No. 723,684
5 Claims. (Cl. 177—120)

This invention relates to a spring loaded compensator for a scale, and more particularly, to a spring loaded compensator for a coal scale in a coal combustion system so that accurate predetermined weights of coal can be continuously fed to the system.

This application is a continuation-in-part of my co-pending application Serial No. 263,537, filed December 27, 1951, for Spring Loaded Compensator, now abandoned.

When material is fed to a scale so that the scale operates responsive to the reception of a predetermined weight of material to cut off the supply of material thereto, the final weight of the material is oftentimes something above the predetermined weight of material. This is true inasmuch as the cut off of the supply to the scale cannot be made instantaneously. For example, in a coal combustion system, coal is discharged from a hopper onto a motor-driven conveyor feed belt which transports the coal to the weigh hopper of a coal scale prior to the introduction of the coal into the furnace of the system. This enables the operator of the system to be aware at all times of the amount of coal passing into the furnace. The coal scale is provided with a counter so that the number of individual weighings made by the scale will be registered. This provides a cumulative reading of the weight of coal passing into the furnace. The weigh lever of the coal scale is arranged to stop the motor driving the conveyor feed belt upon the reception of a predetermined weight of coal. This will, of course, result in stopping the feeding of coal to the weigh hopper. Consequently, it is possible to calculate the total amount of coal fed into the furnace by multiplying the number of individual weighings as shown on the counter by a single predetermined weight of coal. However, the actual weight of coal in the weigh hopper is usually in excess of the predetermined weight. This is true inasmuch as there is a certain amount of coal in the air at the moment the motor is cut off which continues to fall into the weigh hopper. Also, cutting off the motor does not stop the conveyor feed belt instantaneously and consequently there is a certain amount of belt overtravel which results in feeding more coal to the weigh hopper. Therefore, the coal scale is inaccurate by these specific amounts.

Heretofore apparatus has been devised in an attempt to solve this problem of inaccuracies in coal weighing. However, these attempts have not been fully successful due primarily to the fact that the apparatus only offered approximate corrections to the weighing operation. A further disadvantage to prior apparatus resides in their lack of versatility particularly as regards the manner by which corrections are to be effected. Generally the apparatus is placed within the scale housing for the purpose of affecting the weigh lever system of the coal scale. Consequently, adjustments to the apparatus are made within the scale housing during operation of the scale. While this is normally inconvenient on the basis of inaccessibility and cleanliness, the situation becomes exaggerated when the coal scale is being utilized with a furnace operating either under pressure or vacuum. The coal scale in this instance is, like the furnace, similarly under a pressure other than atmospheric and therefore it becomes undesirable and unfeasible to gain access to the apparatus during operation without unduly interfering therewith. Consequently, it is not possible to make the proper adjustments and hence the apparatus becomes of little utility.

According to the present invention, apparatus in the form of a spring loaded compensator is employed to cause the feeding means to stop at such a time that the final weight of material in the weigh hopper will be precisely equal to the predetermined weight of material. This is accomplished by providing a spring biased means to supply a force on the weigh lever assembly of a magnitude and in a direction to counteract the effect of the material passing into the weigh hopper after the feeding has stopped so that the final weight is the predetermined weight. Additionally, the apparatus is arranged so that the tension on the spring can be adjusted from outside of the housing of the scale. Therefore, it is possible to make adjustments while the scale is in operation without unduly interfering therewith.

When this invention, according to one embodiment disclosed herein, is applied to a coal combustion system, the compensator means is arranged to operate upon the weigh lever assembly for the coal scale in the following manner. The lever assembly consists of two arms projecting from opposite sides of the weigh hopper. The arms rest on fulcra adjacent the weigh hopper and their ends are joined by a cross-bar carrying the counterweight. The compensator includes a member pivoted intermediate its ends. One end of the member is biased by a spring, the tension or compression of which is controlled. The other end of the member contacts the cross-bar in such a manner that the force of the spring tends to lighten the effect of the weight carried thereby. Consequently, as coal is fed into the weigh hopper, the weigh lever assembly will be moved prior to the weigh hopper receiving the predetermined weight of coal due to the action of the compensator. When the compensator causes the weigh lever assembly to move, it also actuates a switch which cuts off the motor driving the feed belt and thereby causes the feed belt to stop. The coal received by the weigh hopper as a result of that still falling in the air and the overtravel of the belt at the time the motor is stopped adds to that coal normally received to give the predetermined desired weight. For different conditions, the force of the spring can be manually controlled.

According to another disclosed embodiment of this invention, the compensator means comprises a vertical rod attached at its lower end to the cross-bar referred to above; the upper-end of this vertical rod is spring-biased so as to provide an adjustable and upward force acting against the downward pull of the counter-weight. In this instance, the spring is arranged coaxially around the rod, the lower end of this spring bearing against a movable abutment associated with the frame of the scale, and the upper end of this spring bearing against a plate which transfers an upward force to the rod but only prior to the time that the weigh hopper reaches a condition of balance. As will appear hereinafter, the movable abutment (which actually is the upper surface of a non-rotatable threaded sleeve) is movable to different vertical positions by means of a pair of intermeshing bevel gears, one of which permits adjustment of the abutment, and, hence, the spring pressure, from a point outside of the scale housing. The operation of this spring loaded compensator, constituting the second disclosed embodiment of this invention, is essentially the same as that of the first embodiment, although, as will appear hereinafter, the two embodiments are different from a structural standpoint.

It is an object of this invention to provide a compensator for a scale that will produce more accurate weighings than have been achieved heretofore with devices of a similar character. It is a further object of this invention to provide, in a scale having a closed, dust-tight housing a compensator of the type referred to above wherein the adjustment of the same may be effected externally of the housing.

It is another object of this invention to provide a spring loaded compensator for a coal scale in a coal combustion system, which compensator will permit the feeding of predetermined weights of coal to the furnace of such a system in a more accurate and efficient manner than heretofore attainable.

Other objects and advantageous features of this invention will hereinafter more fully appear in connection with the detailed description of the drawings in which:

FIGURE 6 is a view similar to FIGURE 4 showing the the relationship between the various portions of the coal scale and a portion of a compensator constructed in accordance with a second embodiment of this invention;

FIGURE 7 is a fragmentary elevation (taken from the left-hand side of FIGURE 6), and on an enlarged scale, showing the details of the external control panel associated with the second embodiment of this invention;

FIGURE 8 is a vertical section taken along section line 8—8 of FIGURE 7, showing the details of the compensator and associated structure;

Figure 9:
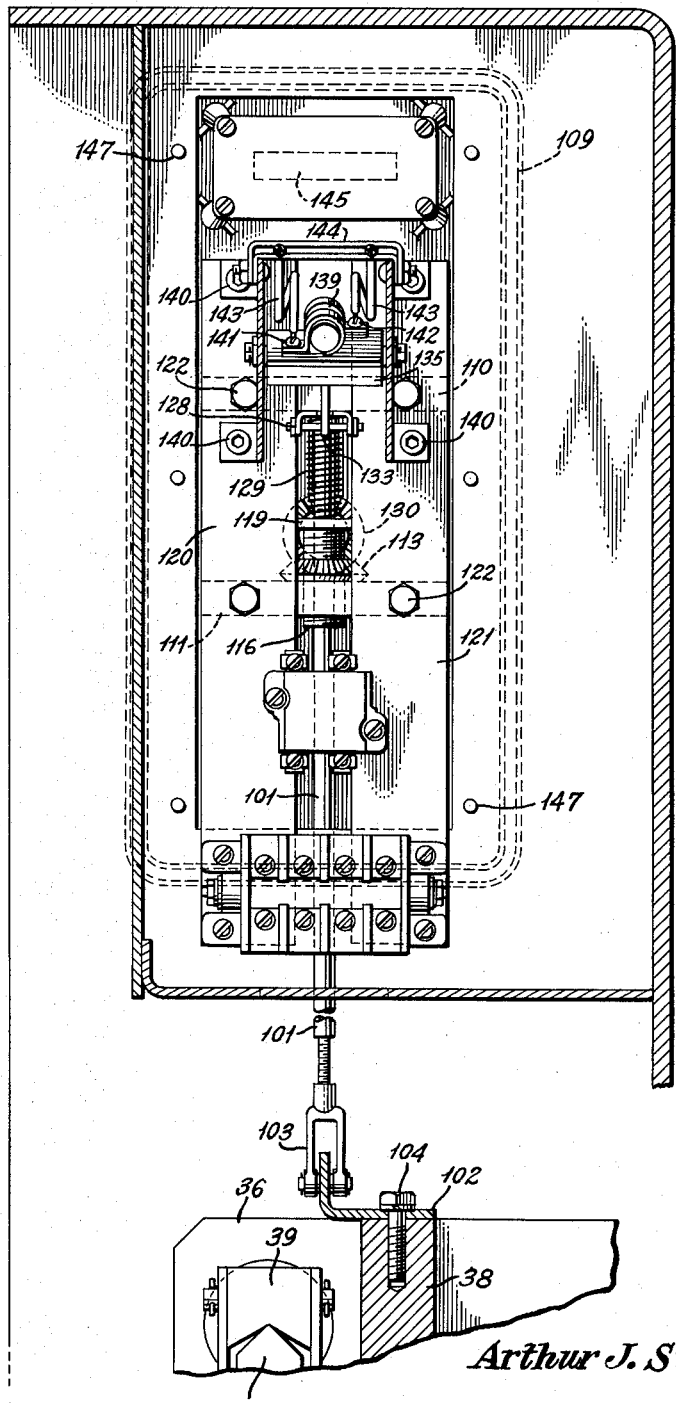
Figure 10:
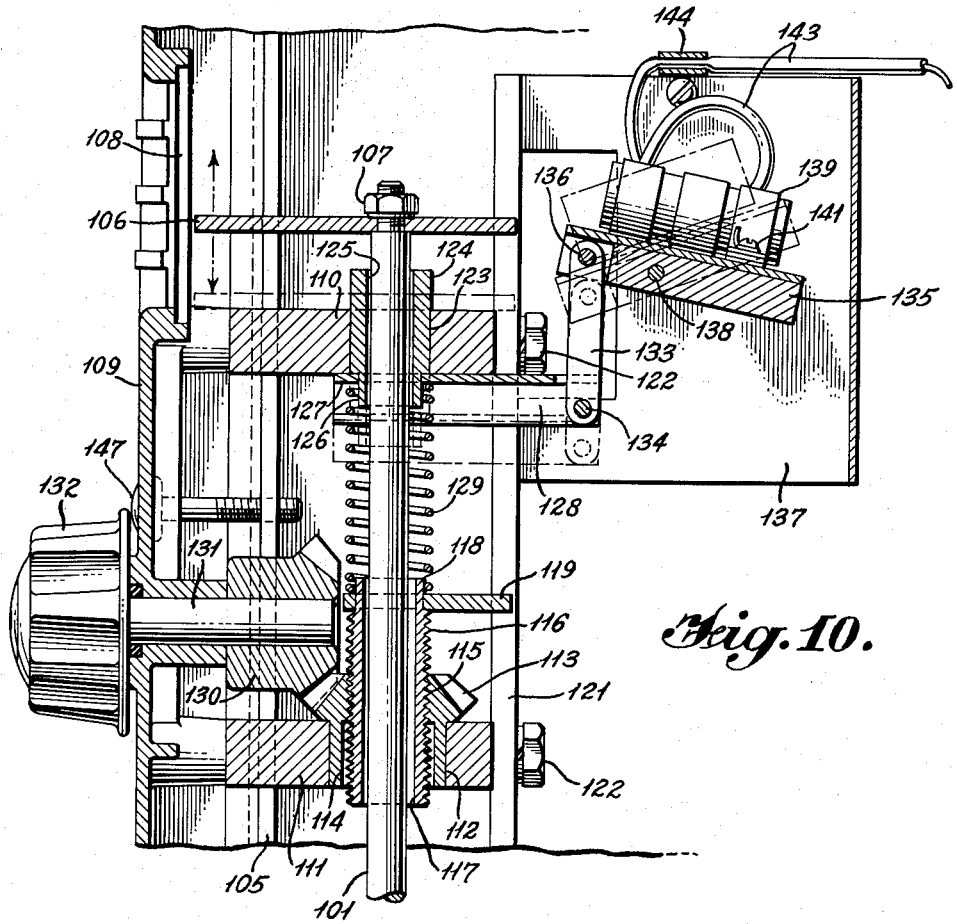

FIGURE 9 is a vertical section taken along section line 9—9 of FIGURE 8, showing additional details of the compensator (constituting the second embodiment of this invention); and FIGURE 10 is a sectional view similar to FIGURE 8, showing a portion thereof on an enlarged scale, and illustrating, in dotted lines, the position assumed by the cutoff switch and its actuating arm before the requisite quantity of coal has been fed to the weigh hopper.

Referring to the drawings in detail, FIGURES 1 to 4, inclusive, show the coal scale and associated structure, and the relationship between the coal scale and the spring loaded compensator which represents one form of the present invention. A downspout 20 having a conventional coal valve 21 at its upper end is joined to a housing 22 in a known manner. It is understood that the top of the downspout 20 is normally connected or bolted to the bottom outlet of a coal hopper or bunker. The housing 22 encloses a conveyor assembly consisting of a feed belt 23 supported on pulleys 26. Skirt plates 24 depend from the top of the housing 22 and are arranged to lie along the edges of belt 23. Also enclosed in the housing 22 is a weigh hopper 27. The above-described members are arranged inside housing 22 so that coal passing through downspout 20 will fall onto the rear end of belt 23. The coal falling off the forward end of belt 23 will be received in the weigh hopper 27.

Figure 1:
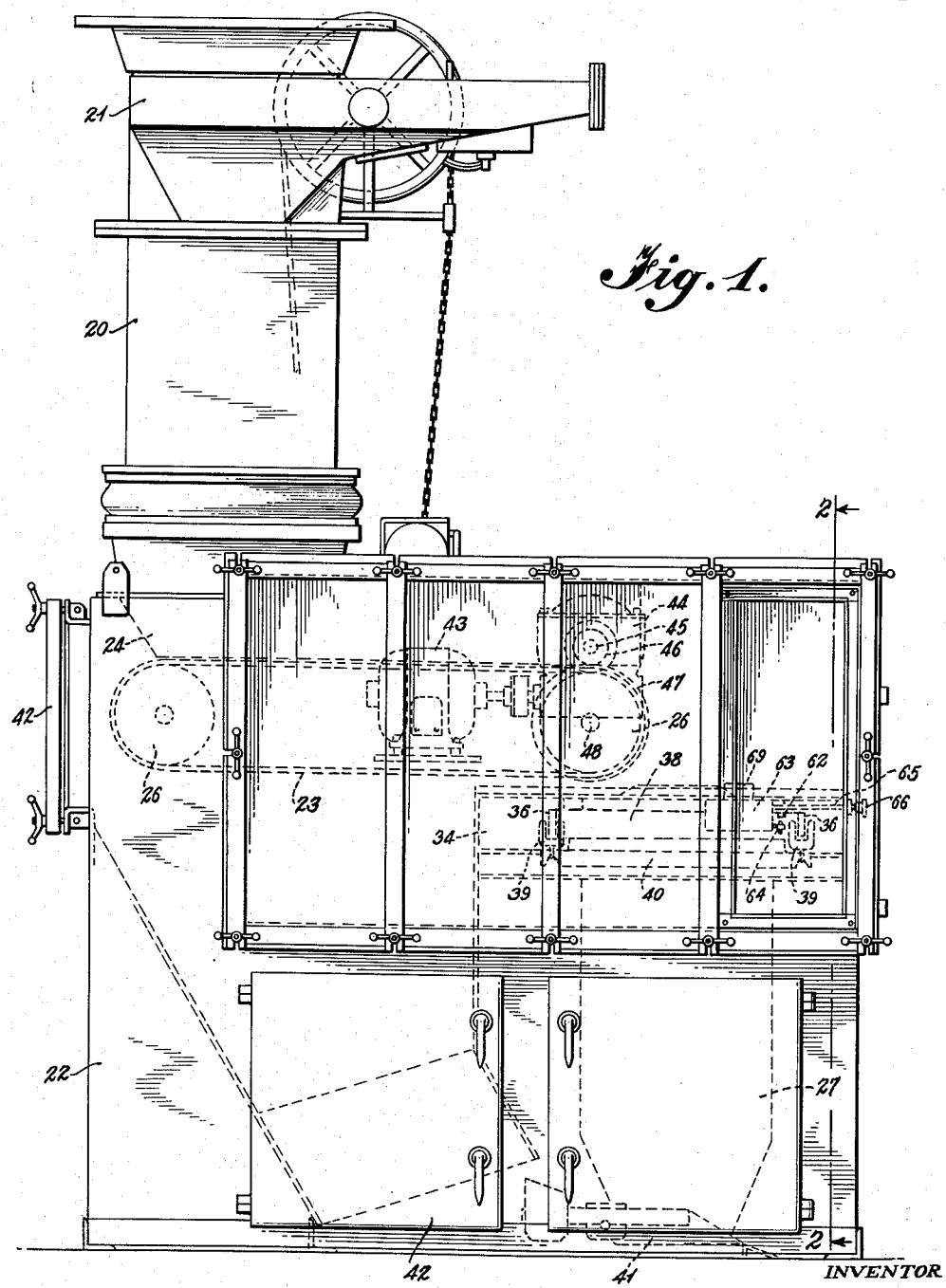
FIGURE 1 is a view in side elevation showing a coal scale provided with a compensator, according to one form of this invention, for use with a coal combustion system.
Figure 2:
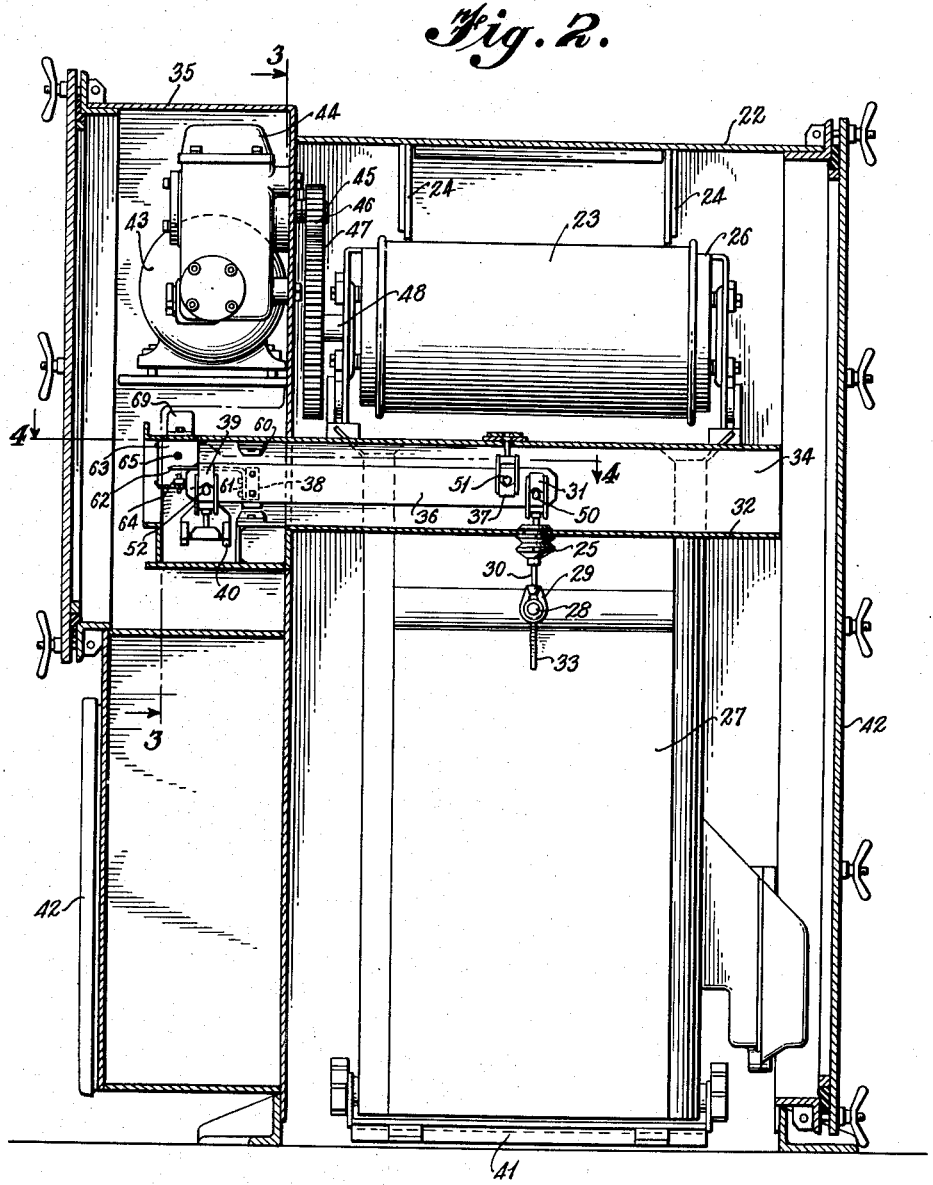
FIGURE 2 is a view in vertical section of FIGURE 1 taken along line 2—2.
Figure 3:
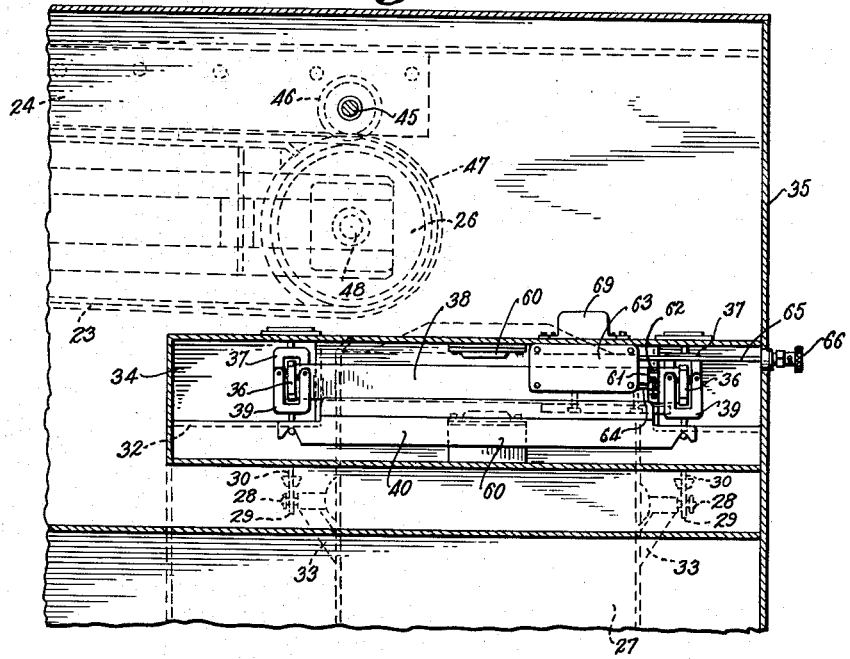
FIGURE 3 is a view in vertical section of FIGURE 2 taken along line 3—3.
Figure 4:
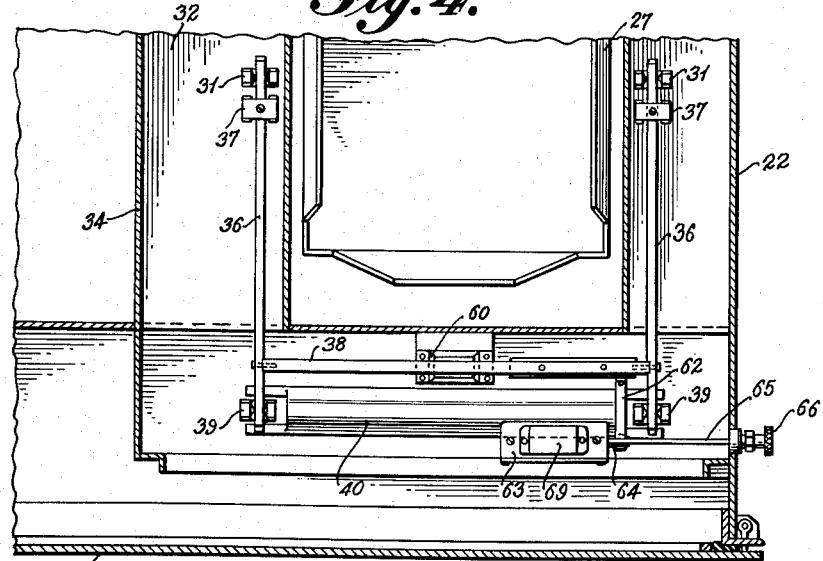
FIGURE 4 is a view in horizontal section of FIGURE 2 taken along line 4—4.

The weight hopper 27 has two pins 28 projecting from opposite sides. The pins 28 are given rigidity by a conventional strut arrangement 33. The loop 29 attached to one end of a shaft 30 is secured to each pin 28. The other ends of the shafts 30 project through partitions 32 into compartments 34 where they are joined to scale bearing loops 31. The shafts 30 at the points of projection through the partitions 32 are encased in molded rubber bellows 25 so that the compartments 34 are maintained pressure tight with respect to the space occupied by the weigh hopper 27 and the conveyor assembly. The top and bottom walls of compartments 34 project into an auxiliary housing 35 as shown in FIGURE 2. The scale bearing loops 31 cooperate with pins 50 rigidly fastened to weigh levers 36 to provide a knife edge attachment for the weigh hopper 27 with one end of weigh levers 36. A knife edge pivot is provided for each of the weigh levers 36 by pins 51 rigidly fastened to weigh levers 36 cooperating with scale bearing loops 37 which are similar to loops 31. The loops 37 are suspended from the top walls of the compartments 34. The other ends of the weigh levers 36 are interconnected by a bar 38 so that they will operate as a single unit. Scale bearing loops 39 similar to loops 31 and 37 cooperate with pins 52 rigidly fastened to weigh levers 36 to form a knife edge attachment for a counterweight 40 with the other ends of weigh levers 36. The counterweight 40 is suspended between the loops 39. The weigh levers 36, bar 38, counterweight 40 and ancillary equipment constitute a weight lever system. Since the lever arms of the system are fixed relative to the pivot points and cannot be lengthened or shortened, the weight lever system can be described as being of the fixed ratio type. The weigh hopper 27 is also conventionally provided with a pivoted counterweighted closure member 41 operated in a suitable manner such as by a solenoid. Doors 42 are also formed in the housing 22 to permit access to the weigh hopper 27 and conveyor assembly.

The auxiliary housing 35 contains a motor 43, the shaft of which is connected to a gear reducer 44. The output shaft 45 of the gear reducer 44 passes through housing 22 and has a gear 46 mounted on its end. A gear 47 mounted on a shaft 48 meshes with gear 46. The shaft 48 is joined to the forward pulley 26. As above described, the motor 43 is mechanically connected to the forward pulley 26 and thereby power is supplied to drive conveyor belt 23.

Mounted on the top and bottom walls of the projected portion of compartments 34 and directly in line with cross-bar 38 are bumper guards 60 which limit the swing of the weigh levers 36. These bumper guards 60 consist of a raised portion of flexible resilient material such as rubber securely held in position by a metal plate. The guards 60 are attached to the top and bottom walls of compartments 34 and are located at approximately the midpoint of cross-bar 38. A leg 61 of an L-shaped member 150 is attached to one side of the cross-bar 38 toward one end by bolting thereto. The other leg 62 of the member projects substantially normally away from cross-bar 38. A spring loaded compensator unit 63 is suspended from the top wall of the projected portion of compartments 34. An arm 64 extends from the unit 63 to a position directly beneath the end portion of leg 62. A shaft 65 also extends from the unit 63 and passes through a wall of auxiliary housing 35. A knob 66 is rigidly mounted on the end of shaft 65. A switch 69 is mounted on unit 63.

Figure 5:
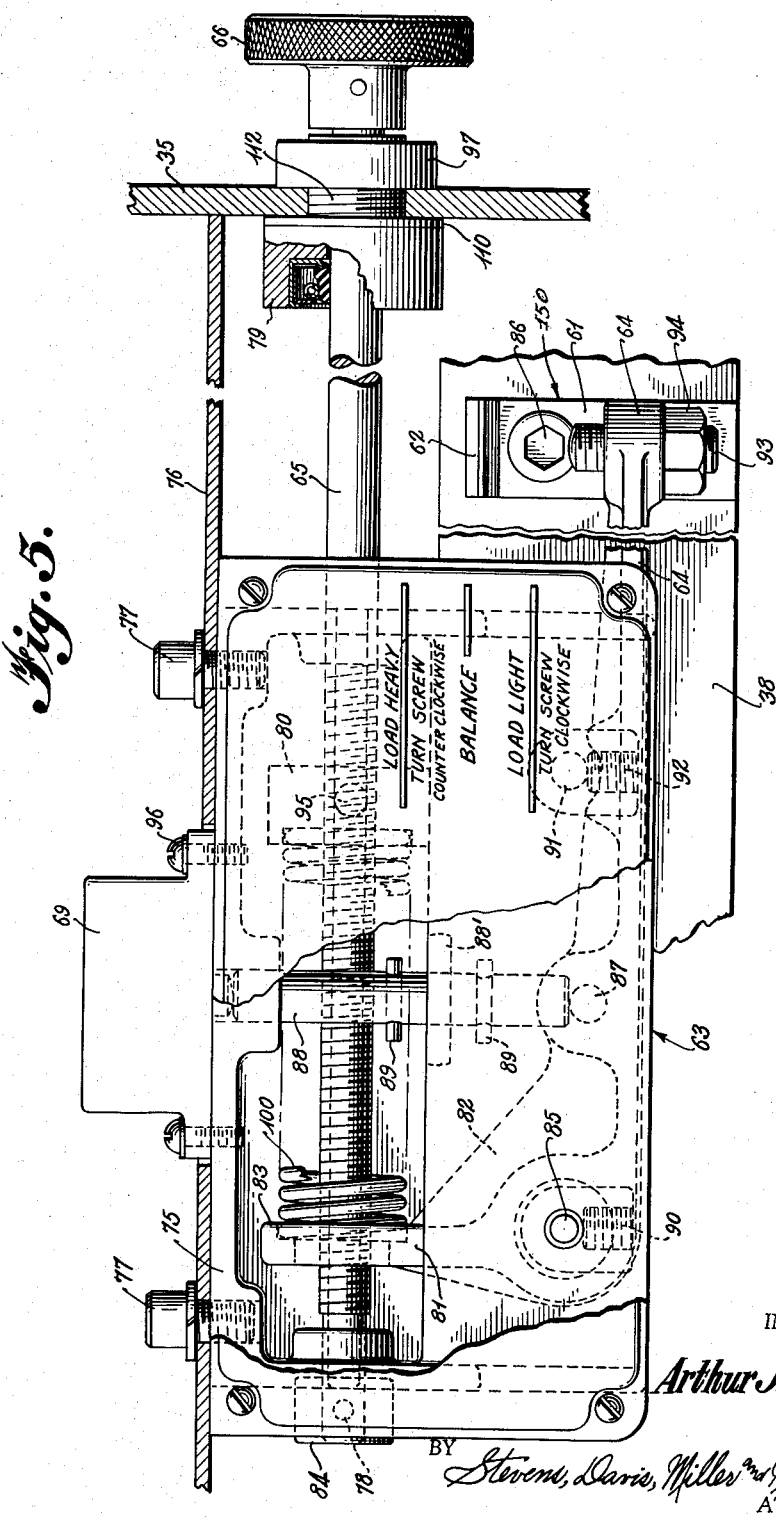
FIGURE 5 is a view in vertical section through the spring loaded compensator.

The details of the spring loaded compensator unit 63 are shown in FIGURE 5. A closed box is defined by a shell structure 75. This box is connected to the top wall 76 of the projected portions of compartments 34 by bolts 77 as previously described. A threaded shaft 65 is contained within shell 75 and one end 78 is bearing mounted in a collar 84 in a wall of shell 75. The other end of the shaft 65 extends from the opposite wall of shell 75 and passes through the wall of auxiliary housing 35 as previously described. The point at which the shaft 65 passes through auxiliary housing 35 is provided with a shaft seal designated as 79 which permits rotation of the shaft 65. A rubber washer 110 fits on the end of member 79. Also member 79 contains a screw-threaded projection 112 which passes through the wall of housing 35. A nut 97 is mounted on projection 112 in order to make a pressure-tight connection. Shaft 65 passes through seal 79 and has a knob 66 mounted on its end. A nut 80 is mounted on the threaded shaft 65 and prevented from rotating by means of a groove pin 95 so that rotation of the shaft 65 will produce a longitudinal movement of the nut 80 relative to the shaft 65. One arm 81 of the bell crank 82 is provided with a loop 83 through which shaft 65 passes. The bell crank 82 pivots about an axis defined by shaft 85. A set screw 90 is provided to prevent end-wise movement of shaft 85. The other arm 64 of the bell crank 82 is provided with a projecting lug 87 upon which rides a push rod 88 which is guided at its upper end by the structure 75 and at its lower end by rectangular guide 88' fixed to structure 75. Groove pins 89 which are mounted in bores in rod 88 limit the vertical movement of rod 88. The end of the bell arm 64 holds a stud 93 by means of a nut 94. The stud 93 is positioned directly beneath the leg 62 of the L-shaped member whose leg 61 is attached to cross-bar 38 by bolts 86. A compressed spring 100 is mounted on shaft 65 between nut 80 and loop 83. The arm 64 is also provided with a limit stop by means of a lug 91 resting on a set screw 92. By means of this arrangement, the stud 93 exerts a force on the leg 62 only during the lower part of its travel. Hence, as the leg 62 moves upwardly, it frees itself from the influence of the compensator unit.

The rod 88 is arranged to actuate a switch 69 which is mounted on the unit 63 by screws 96. The switch 69 is preferably of the snap switch type and is directly connected to actuate the condition of the solenoid holding the closure 41 in a closed position and to cut the power to motor 43. The compensator unit 63 is so arranged that stud 93 lies directly beneath leg 62 of the L-shaped member fixed toward the end of cross-bar 38 by having its arm 61 bolted thereto. By the peculiar arrangement of elements, the spring 100 exerts an upward force through bell crank 82 and stud 93 on the leg 62. This upward force tends to detract from the downward force exerted by the counterweight 40.

The amount of subtraction can, of course, be controlled by turning knob 66 to tighten or loosen the degree of compression on spring 100. The amount of subtraction is generally preselected to compensate approximately for the characteristics of each specific assembly. To accomplish this, the compensator 63 must be set to actuate switch 69 to cut off motor 43 ahead of the weigh hopper 27 receiving a full balanced load so that the dribble or coal still in the air plus the coal dropped into the weigh hopper 27 caused by overriding of the conveyor belt 23 will combine additively with the coal normally received in weigh hopper 27 to give a full balanced load. Thereafter the switch 69 is energized to release closure 41 and permit the coal to be discharged preparatory to a succeeding weighing. Inasmuch as conditions will vary during succeeding weighings the operator is accorded a visual picture by means of leg 62 and a legend on the surface of the compensator 63 so that he can make minor adjustments by means of knob 66 whenever necessary. In use, adjustments to the compensator are necessary at frequent intervals since variations in the size and moisture content of the coal change its angle of repose at the end of the feed belt which changes the amount of dribble.

While the compensating means of the present invention has utility with any known type of coal scale, it has particular utility with a coal scale in which the weighing operation occurs under a pressure other than atmospheric pressure. In this type of a coal scale it is desirable to make adjustments to the compensating means without gaining access to the weigh lever mechanism in order not to interfere with the weighing operation. Hence, in the present invention, the shaft 65 of the compensating means is brought outside of the scale housing and is sealed as indicated at 79. Consequently, manual adjustments to the compensating means can be effected without interference with the weighing operation.

The operation of the apparatus is as follows. The automatic scale with its automatic feed (belt conveyor 23) is operated to pass coal or other material from a source such as a hopper or bunker through the outlet of the scale mechanism to a point of use. In order to avoid possible inaccuracies in the weighing operation, the scale lever system is housed in a dust-tight compartment separate from the scale hopper. The material is fed along the automatic feed, shown as conveyor belt 23, and is received in hopper 27. Eventually the hopper 27 will receive a weight of material sufficient to cause an upward movement of the counterweight end of the weigh lever system. It will be recalled at this point that the spring 100 of the compensator is acting on the weigh lever system tending to move it upwardly into balance with the hopper 27. Thus, the weight of material in hopper 27 does not entirely by itself cause the upward movement of the counterweight end of the lever system.

When the lever system has moved to the point where arm 62 mounted on cross arm 38 indicates load light or slightly below that point, further effect of spring 100 on the lever system is prevented by stop 91. At the same time, the compensator will cause a switch to be thrown resulting in the automatic feed being stopped. The material, then in the air and spilled by overtravel of belt 23, will subsequently fall into hopper 27. The final weight of material in hopper 27 will be the predetermined weight for which the automatic scale has been set. This can be readily checked by determining if the scale is in balance. It will be, if indicating arm 62 is opposite the balance marking on the housing of the compensator. Further, this will be a true weight since the effect of spring 100 is prevented above the load light indication on the compensator housing.

If the weight of material in hopper 27 is heavy or light the automatic scale can be compensated by simply manipulating the knob 66 from outside the apparatus to increase or decrease the effect of spring 100. The desirability of this arrangement and its simplicity is apparent. The compensations for off-weights can be made without entering the dust-tight housing, which protects the weigh lever system, solely by turning knob 66. The shaft 65 connected to knob 66 passes through the housing 35 and is sealed to be dust-tight. Finally, the hopper closure is released, the material dumped through the outlet, the hopper closure secured, and the automatic feed started again. The operation is thereafter repeated.

The spring loaded compensator illustrated in FIGURES 6 to 10, inclusive, represents a second embodiment of the present invention. As far as this second embodiment is concerned, the structure shown in FIGURES 1, 2, 3 and 4 will remain substantially the same; i.e. the weighing lever, the weigh hopper, the calibrated weight, the downspout, and the conveyor assembly for feeding coal to the hopper are all arranged in substantially the same manner as illustrated in FIGURES 1 to 4, inclusive. Also, the dust-tight housing will be substantially the same except that there is a slight modification of one portion of the housing consistent with the description which follows. However, the spring loaded compensator of the first embodiment, which is shown in detail in FIGURE 5, has been completely replaced by the spring loaded compensator constituting the second embodiment, which is fully illustrated in FIGURES 6 to 10, inclusive.

The essential points of similarity between the two compensators disclosed herein is (1) that they both operate through the agency of the cross-bar 38 and (2) that they both exert an upward force on the weigh levers 36 in opposition to the downward pull of the counterweight 40.

Referring now to FIGURES 6, 8 and 9, a substantially vertical push rod 101 is attached at its lower end to an L-shaped bracket 102 by means of swivel connection 103. Bracket 102 is secured to the cross-bar 38 by means of bolts 104. The upper portion of the vertical rod 101 is enclosed within a suitable casing 105 which constitutes an upward extension of the compartment 34 shown in FIGURES 1 to 4, inclusive. At the upper end of the vertical rod 101 a tongue or marker plate 106 is suitably secured thereto by means of a nut 107. The position of this marker plate 106 may be ascertained externally of the casing 105 through a window 108 located in the upper central portion of the control panel 109. The alignment of this marker plate 106 with one of the three positions designated as "heavy," "balance" and "light," after the conveyor belt 23 has been stopped, will indicate the relative amount of coal in the weigh hopper 27.

A pair of vertically spaced horizontal plates 110 and 111 (constituting guide means for the push rod and associated structure as will hereinafter appear) are suitably secured by means of bolts (not shown) to the control panel 109. The lower plate 111 is provided with a centrally located hole 112 in which the lower end of a bevel gear 113 is free to rotate. Bevel gear 113 is provided with an internal bore 114, the upper reduced end of which is provided with internal threads as at 115. An externally threaded sleeve 116 is received within the bore 114 of the bevel gear 113 so as to engage the threaded portion 115 thereof.

The threaded sleeve 116 is provided with a central bore 117 in which the push rod 101 is free to move in a vertical direction. The upper end of the threaded sleeve 116 is provided with a reduced cylindrical portion 118 upon which is fixedly received a flat tongue or guide 119. The right-hand end of the tongue 119 (as it appears in FIGURES 8 and 10) projects into the vertical space between two vertical plates 120 and 121 which are secured to the horizontal plates 110 and 111 by means of bolts 122. Rotation of the bevel gear 113 about its vertical axis, therefore, will cause downward and upward movement of the threaded sleeve 116, since the tongue 119, by virtue of its projection into the space between the two vertical plates 120 and 121, prevents rotation of the threaded sleeve.

The upper horizontal plate 110 is provided with a circular hole 123 in which a bushing 124 is slidably received. The bushing 124, in turn, is provided with an internal bore 125 through which the push rod 101 is free to move in a vertical direction. The slidable bushing 124 has, at the lower end thereof, a reduced cylindrical portion 126 which is suitably received within a hole in the horizontal portion 127 of an inverted U-shaped plate 128. A helical spring 129 surrounds the push rod 101 such that the upper end of this spring is received on the lower reduced cylindrical portion 126 of the bushing 124 and bears against the under side of the flat portion 127 of the U-shaped member 128; the lower end of this helical spring 129 is received on the reduced cylindrical portion 118 of the threaded sleeve 116 so as to bear against the upper surface of the tongue 119.

A second bevel gear 130, arranged in meshing relationship with bevel gear 113, is mounted on a horizontal shaft 131, the left-hand end of which projects outwardly from the control panel 109. A suitable control knob 132 is keyed to the outer projecting end of this shaft 131. Thus, it should be apparent that turning the control knob 132 (externally of the control panel 109) will cause rotation of the bevel gears 130 and 113, which will result in upward or downward movement of the threaded sleeve 116, depending upon the direction of rotation of this control knob. In like manner, upward or downward movement of the threaded sleeve 116 will cause a relative compression or expansion of the helical spring 129 between the elements 119 and 127, (as these elements appear in their solid line positions in FIGURE 10).

A substantially vertical arm 133 is pivotally attached at its lower end to the inverted U-shaped member 128 by means of a pin 134 which passes through suitable holes in the sides of the inverted U-shaped member. The upper end of the arm 133 is pivotally attached to a block 135 by means of another pin 136, and the block 135, in turn, is pivotally attached to a sub-housing 137 by means of a third pin 138. A mercury switch 139 is mounted on the block 135 such that the making or breaking of electrical contacts within the mercury switch will be determined by the relative tilted position of the block 135. The sub-housing 137 surrounds the mercury switch 139 and is attached to the vertical plates 120 and 121 by means of screws 140. A slight vertical adjustment of the sub-housing 137, and hence the switch block 135, can be effected by loosening the screws 140 and retightening the same after the desired position of the sub-housing is obtained.

From the terminals 141 and 142 of the mercury switch 139, a pair of pigtail leads 143 extend outwardly from the sub-housing 137. These pigtail leads are held in place adjacent the upper end of the sub-housing by means of clamp 144. The pigtail leads 143 are connected by means of suitable wiring and switches, etc. (the details of which are considered conventional and hence are not shown) to the motor 43 which drives the conveyor belt 23. Referring to FIGURE 10, the solid line position of the mercury switch 139 represents that condition where the internal circuit thereof is interrupted such that the motor 43 is deenergized. On the other hand, in the dotted line position of the switch 139, shown in FIGURE 10, the internal contacts therein are bridged by mercury and hence the motor 43 could be energized so as to drive the conveyor belt 23. Also, a suitable electrical circuit (the details of which are considered conventional and hence are not shown) is provided so as to be responsive to the movement of the mercury switch into the solid line position of FIGURE 10 for the purpose of opening the closure member 41 of the weigh hopper 27 at some time subsequent to the stopping of the motor 43.

The control panel also includes a counter 145, the reading of which indicates the total number of loads received and dumped by the weigh hopper 27. Any conventional electrical circuit could be employed to make this counter register in accordance with the movement of the mercury switch 139 or with the opening of the closure member 41. For the sake of convenience, an electrical switch 146, employed for supplying power to all of the electrical units associated with the weigh hopper system described herein, is located on the outside of the control panel 109. The control panel 109 is secured to the vertical partition 105 by means of threaded bolts 147.

The control panel 109 and all of the various components projecting through the control panel exterior of the coal scale system are provided with suitable sealing means such as gaskets, O-rings, etc. so as to maintain the entire apparatus in a dust-tight relationship with the atmosphere.

The operation of the spring loaded compensator constituting the second embodiment of this invention will now be briefly described with reference to the weighing of one load of coal into the weigh hopper 27. The corresponding positions of the various elements shown in FIGURE 8 and those shown in solid lines in FIGURE 10 represent the condition where (1) the weigh hopper has been filled with coal, (2) the motor 43 driving the conveyor belt 23 has been stopped, but (3) the closure member 41 for the weigh hopper 27 has not yet been opened. Thereafter, the closure member 41 is opened and the load of coal therein is discharged into a hopper leading to the combustion furnace. As soon as the load of coal is released from the weigh hopper 27, the left-hand side ends of the weigh levers 36 (as they appear in FIGURES 2 and 9) will drop to their lowermost positions. This downward movement of the weigh levers 36 will pull the vertical rod 101 downwardly such that the marker plate 106 will contact the upper end of the slidable bushing 124. As the rod continues in its downward movement the bushing 124 will also slide downwardly with the result that the inverted U-shaped member 128 is also forced downwardly compressing the spring 129 between the flat portion 127 of the U-shaped member and the tongue 119. Downward movement of the inverted U-shaped member 128 causes downward movement of the arm 133 and a corresponding counter clockwise movement of the block 135 about the pin 138. The mercury switch 139 then assumes the position shown in dotted lines in FIGURE 10 such that the internal contacts are bridged, permitting subsequent operation of the feed motor 43. The marker plate 106 is now adjacent the upper surface of the vertical plate 110.

After the closure member 41 has been closed, electrical current passes through the mercury switch 139 and the motor 43 commences to operate. Coal is fed into the weigh hopper 27 from the downspout 20 by means of the conveyor belt 23. During the time that coal is being fed to the weigh hopper 27, the helical spring 129 will be exerting an upward force on the lower surface of the flat portion 127 of the inverted U-shaped member 128. Also, since the rod 101, the marker plate 106, and the slidable bushing 124 have been moved downwardly, the upward force exerted against the U-shaped member 128 will be transmitted to the bushing 124 and in turn to the marker plate 106 so as to create an upward force along the rod 101. The upward force on the push rod 101 has the effect of reducing the downward force created by the counter weight 40 on the weigh levers 36. Thus, the weigh levers 36 are forced upwardly toward an artificially created condition of balance prior to the time that the predetermined desired weight of coal is received within the weigh hopper 27. As soon as the weigh levers 36 move towards this condition of balance, elements 128, 124 and 106, as well as the push rod 101, will be moved upwardly. When the inverted U-shaped element 128 reaches the approximate position indicated by the solid line position shown in FIGURE 10 the mercury switch 139 cuts off the power to the motor 43, thus stopping the movement of the feed belt 23. At this point, the helical spring no longer exerts any force whatsoever on the push rod 101.

After the motor 43 has stopped, an additional quantity of coal will fall into the weigh hopper 27 due to the over travel of the conveyor belt 23 and due to the fact that there was coal in the air at the time that the motor 43 was deenergized. This additional increment of coal will cause the weigh levers 36 to move even further upwardly such that the push rod 101 and the marker plate 106 attached thereto will continue to move upwardly beyond the slidable bushing 124 to a final position of rest, as for example, as indicated in solid lines in FIGURE 10. The above described sequence of operation are then repeated for subsequent weighings of coal.

It should be apparent from a consideration of FIGURE 10 that the amount of upward force exerted on the U-shaped member 128, which also represents the amount of upward force exerted against the push rod 101 when the weight hopper is in an empty or partially filled condition, will be dependent upon the compression of the spring 129. The compression of the spring 129 may be varied by moving the tongue 119 upwardly or downwardly through the rotation of the internally threaded bevel gear 113.

When the weight levers 36 come to a final position of rest and the marker plate 106 is in the relative position shown in FIGURE 7, the operator knows immediately that the amount of coal in the weight hopper is somewhat less than the predetermined required quantity. The counter-clockwise arrow 148 to the right of the legend "light" tells the operator that the control knob 132 must be turned in a counter-clockwise direction in order to bring subsequent weighings up to the required predetermined amount. If, on the other hand, the marker plate 106 should come to rest adjacent the legend "heavy," the operator would know that the control knob 132 should be turned in a clockwise direction, as indicated by the arrow 149. Thus, if the density of the coal being fed through the down spout 20 should change, a corresponding adjustment of the control knob 132 will permit the correction of any errors due to this change in density such that subsequent weighings may be adjusted to exactly the predetermined required amount.

Although this invention has been described with particular reference to the illustrations shown in the drawings, nevertheless, it should be understood that various other modifications and changes, apart from those shown or suggested herein, may be made by one skilled in the art without departing from the spirit and scope of the present invention.

What is claimed is:

1. Apparatus for feeding predetermined weights of material which comprises a dust-tight housing, a weighing lever pivotally mounted intermediate its ends on a fixed pivotal support in said housing, a hopper suspended from one end of said lever in said housing, a calibrated weight suspended from the other end of said lever in said housing, means for feeding material to said hopper, a bell crank pivotally mounted on a fixed support within said housing and having a first arm engaging said other end of said weighing lever, a second arm on said bell crank, a rotatable rod passing through a hole in said second arm and being bearing-supported at one end within said housing, said rod extending through an opening in said housing and terminating at its other end outside of said housing, a handle attached to said other end of said rod for turning the same from outside of said housing, means received in said opening in said housing and surrounding said shaft for providing a dust-tight seal between said rod and said housing, a nut received on said rod within said housing and being movable in a direction along the axis of said rod upon the rotation of said rod, a spring means mounted on said rod having one end bearing against said second arm and the other end bearing against said nut, said spring and said bell crank urging said other end of said weighing lever upwardly prior to the reception of said predetermined weight of material into said hopper, and means responsive to the upward movement of said first arm of said bell crank for stopping said feeding means in advance of the reception of said predetermined weight of material in said hopper.

2. Apparatus for feeding predetermined weights of material which comprises a dust-tight housing, a weighing lever pivotally mounted intermediate its ends on a fixed pivotal support in said housing, said lever being pivotal in a substantially vertical plane, a hopper suspended from one end of said lever in said housing, a calibrated weight suspended from the other end of said lever in said housing, means for feeding material to said hopper, a bell crank pivotally mounted on a fixed support within said housing, said bell crank being pivotal in a vertical plane substantially at right angles to the pivotal plane of said weighing lever, a first arm on said bell crank engaging the under side of said other end of said weighing lever, a second arm on said bell crank, a rotatable rod passing through a hole in said second arm and being bearing-supported at one end within said housing, said rod extending through said housing and terminating at its other end outside of said housing, a handle attached to said other end of said rod for turning the same from outside of said housing, means received in said opening in said housing and surrounding said shaft for providing a dust-tight seal between said rod and said housing, a nut received on said rod within said housing and being movable in a direction along the axis of said rod upon the rotation of said rod, a spring means mounted on said rod having one end bearing against said second arm and the other end bearing against said nut, said spring and said bell crank urging said other end of said weighing lever upwardly prior to the reception of said predetermined weight of material into said hopper, and means responsive to the upward movement of said first arm of said bell crank for stopping said feeding means in advance of the reception of said predetermined weight of material in said hopper.

3. Apparatus for feeding predetermined weights of material to and from a weighing hopper which comprises a dust-tight housing, a weighing lever pivotally mounted intermediate its ends on a fixed pivotal support in said housing, said lever being pivotal in a substantially vertical plane, a hopper suspended from one end of said lever in said housing, a closure at the lower end of said hopper, a calibrated weight suspended from the other end of said lever in said housing, means for feeding material to said hopper, a bell crank pivotally mounted on a fixed support within said housing, said bell crank being pivotal in a vertical plane substantially at right angles to the pivotal plane of said weighing lever, a first arm on said bell crank engaging the under side of said other end of said weighing lever, a second arm on said bell crank, a rotatable rod passing through a hole in said second arm and being bearing-supported at one end within said housing, said rod extending through an opening in said housing and terminating at its other end outside of said housing, a handle attached to said other end of said rod for turning the same from outside of said housing, means received in said opening in said housing and surrounding said shaft for providing a dust-tight seal between said rod and said housing, a nut received on said rod within said housing and being movable in a direction along the axis of said rod upon the rotation of said rod, a spring means mounted on said rod having one end bearing against said second arm and the other end bearing against said nut, said spring and said bell crank urging said other end of said weighing lever upwardly prior to the reception of said predetermined weight of material into said hopper, and means responsive to the upward movement of said first arm of said bell crank for stopping said feeding means in advance of the reception of said predetermined weight of material in said hopper and for thereafter opening said closure to discharge said material from said hopper.

4. Apparatus for feeding predetermined weights of material which comprises a dust-tight housing, a weighing lever pivotally mounted intermediate its ends on a fixed pivotal support in said housing, said lever being pivotal in a substantially vertical plane, a hopper suspended from one end of said lever in said housing, a calibrated weight suspended from the other end of said lever in said housing, means for feeding material to said hopper, a substantially vertical rod operatively connected to said other end of said lever, a helical spring surrounding one portion of said rod, an abutment on said rod, a movable platform mounted within said housing, one end of said spring being operatively connected to said abutment at least prior to the time that said hopper receives said predetermined weight, the other end of said spring bearing against said movable platform, a fixed support in said housing, means coacting between said fixed support and said movable platform for varying the position of said platform to vary the compression in said spring, means extending externally of said housing for adjusting said position-varying means, and means responsive to the vertical movement of said rod for actuating said feeding means.

5. Apparatus for feeding predetermined weights of material which comprises a dust-tight housing, a weighing lever pivotally mounted intermediate its ends on a fixed pivotal support in said housing, said lever being pivotal in a substantially vertical plane, a hopper suspended from one end of said lever in said housing, a calibrated weight suspended from the other end of said lever in said housing, means for feeding material to said hopper, a substantially vertical rod operatively connected to said other end of said lever, a pair of vertically spaced horizontal plates supported within said housing, a bevel gear channeled in the lower of said horizontal plates for rotation about a vertical axis coaxial with the longitudinal axis of said rod, said bevel gear having an internally threaded portion therein, an externally threaded sleeve received within said bevel gear and adapted to engage the threaded portion thereof, said threaded sleeve having a vertical bore for permitting the vertical movement of said rod therethrough, a horizontally extending guide member secured to said threaded sleeve and engaging a vertical slot within said housing so as to prevent relative rotational movement of said threaded sleeve about its vertical axis, a vertically slidable bushing received within a hole in the upper of said two horizontal plates, said bushing having a vertical bore for permitting the vertical sliding movement of said rod therethrough, a horizontal member located below said slidable bushing and having a hole therein for the passage of said rod therethrough, a helical spring surrounding said rod, the lower end of said spring bearing against the upper surface of said guide means, the upper end of said spring bearing against the lower surface of the horizontal member, means responsive to the vertical movement of said horizontal member for actuating said feeding means, and a flat marker plate secured to the upper end of said rod above said slidable bushing.

References Cited in the file of this patent
UNITED STATES PATENTS

| | | |
|---|---|---|
| 73,273 | Willoughby | Jan. 14, 1868 |
| 570,299 | Richards | Oct. 27, 1896 |
| 800,632 | Curtin | Oct. 3, 1905 |
| 1,864,545 | Marsh | June 28, 1932 |
| 2,336,347 | Clifford | Dec. 7, 1943 |
| 2,372,746 | Stock | Apr. 3, 1945 |